United States Patent Office 2,894,597
Patented July 14, 1959

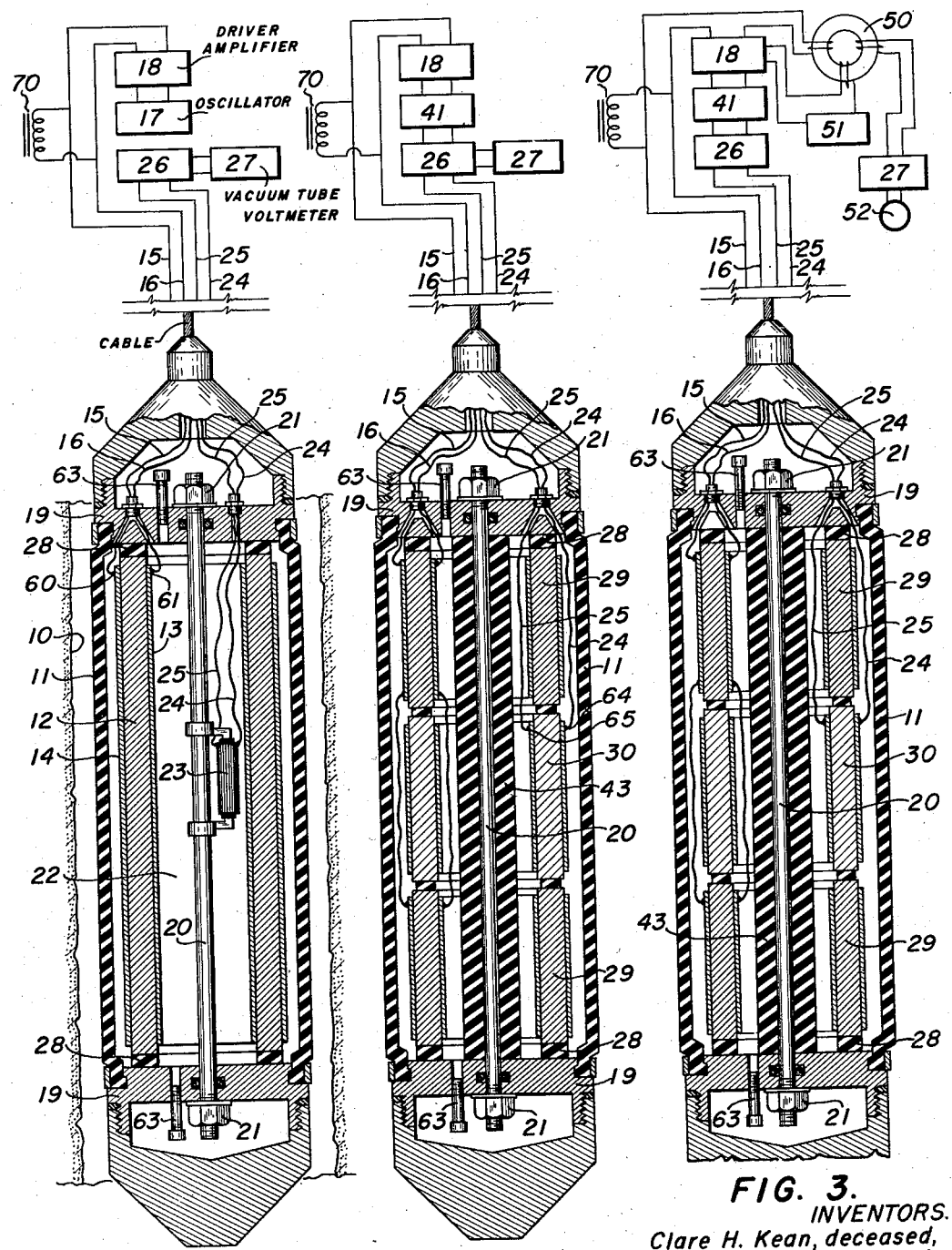

2,894,597

ACOUSTIC WELL LOGGING APPARATUS

Clare H. Kean, deceased, late of Houston, Tex., by Lucile Kean, executrix, Houston, Tex., and Frank N. Tullos and Harold C. Hougen, Houston, Tex., assignors, by mesne assignments, to Jersey Production Research Company, Tulsa, Okla., a corporation of Delaware Application November 1, 1954, Serial No. 466,114

5 Claims. (Cl. 181—.5)

This invention relates to an apparatus for logging the acoustical properties of subsurface formations. More particularly, this invention relates to an improved instrument adapted to be lowered into a borehole for the purpose of measuring the acoustical impedance of subsurface formations traversed by said borehole.

Instruments and methods have heretofore been utilized within a borehole for measuring the acoustic impedance of subsurface formations. These instruments have in common a source for emitting acoustical waves into the subsurface formations and a means for detecting reflections of said acoustical waves and giving an electrical indication of the type of formations traversed. In order to obtain useful data as to the acoustic impedance of the subsurface formations it is necessary that the acoustic waves emitted from the source of acoustic energy be emitted substantially radially with respect to the housing in which the source of energy is contained and that waves which are not emitted radially are kept to a minimum. Other kinds of acoustic well logging apparatus are presently in use. However, these well logging apparatus have the disadvantage that a large amount of "longitudinal waves" or "standing waves" are also emitted. The recording of these standing waves is undesirable in that the standing waves are superimposed upon the desired radial waves. Therefore, it would be highly desirable to devise an instrument which is more efficient than present acoustic well logging apparatus in that the standing waves are greatly reduced with no reduction in the amount of radial waves emitted.

It is an object, therefore, of this invention to provide a new improved acoustic well logging device which is very efficient in emitting acoustical waves radially and which emits a minimum of longitudinal waves.

Briefly described, my invention consists of a piezoelectric means, such as barium-titanate crystals with electrodes, which are located within a housing with said housing being adapted to be lowered and raised within a borehole. Means, such as electrical equipment, which may be located at the earth's surface, if desired, are utilized for causing the cyclic expansion and contraction of the barium-titanate crystals. This expansion and contraction of the barium-titanate crystals results in the sending of the acoustical waves through the subsurface formations traversed by the housing. Means for detecting reflected portions of the acoustical waves are also provided within the housing. Associated with the detecting means are electrical means, which also may be located at the earth's surface, for obtaining an electrical signal which is indicative of the type of formations traversed by the housing.

Other objects and advantages of the present invention may be seen from a reading of the following description taken with the drawings, in which:

Fig. 1 is a side elevational sectional view of one embodiment of my invention;

Fig. 2 is a side elevational sectional view of a second embodiment of my invention; and Fig. 3 is a side elevational sectional view similar to the embodiment shown in Fig. 2 but with a different electrical system for recording the small change in driving current which is caused by changes in electrical impedance of the crystals which in turn is caused by changes of acoustic impedance.

Referring to the drawing, and more particularly to Fig. 1, numeral 10 represents the side of a borehole into which our new instrument is to be raised and lowered by means of a cable. Usually the borehole is filled with a fluid, such as a mud drilling fluid, which is commonly used in rotary drilling. Our new instrument consists of a housing 11 which is preferably made of rubber. Located within the housing and coaxial therewith is a cylinder 12 consisting of an element which exhibits piezoelectric qualities. It has been found that barium-titanate crystals, for example, when actuated, emit predominantly radial acoustic waves. Disposed about the inside periphery and the outside periphery of the piezoelectric cylinder 12 is an electrode 13 and an electrode 14, respectively, which may be silver foils. Provided within the cable utilized for raising and lowering the housing 11 are conductors 15 and 16 connected to terminals 60 and 61 of the piezoelectric crystal 12 and lead to the instruments arranged at the earth's surface. In order to excite the barium-titanate crystals 12, we provide at the earth's surface an oscillator 17 which is utilized to provide a constant frequency signal. Electrically associated with the constant frequency oscillator 17 is a driver amplifier 18 for furnishing a constant voltage. A choke 70 is provided across the input of the cylinder 12 in order to raise the electrical impedance and remove the necessity of a high current from the driver amplifier 18. The housing 11 is provided with end plates 19 which are screwed upon a supporting rod 20 by means of compressing nuts 21. The piezoelectric cylinder 12 along with the end plates 19 define a space 22. This space 22 is entirely filled with a suitable nonconducting liquid by means of filling tubes 63. This liquid should be of such nature that the viscosity does not change with variation in temperature and provides an acoustic coupling between cylinder 12 and pickup 23 which may also be made of barium-titanate, and the mud column of the borehole. Also provided within the housing 11 are rubber cushions 28 which function to cushion the vibration of the barium-titanate cylinder 12. Leading from the barium-titanate pickup 23 are conductors 24 and 25. Any electrical signal from the pickup 23 is transmitted through conductors 24 and 25 to a preamplifier output 26 and recorded in a recording vacuum tube voltmeter 27.

In Fig. 2 there is shown another modification of our new invention. As shown in Fig. 2, in place of single cylinder 12 there is utilized a plurality of barium-titanate cylinders 29 and in place of the pickup 23, as shown in Fig. 1, there is positioned a pickup 30 which is located between the barium-titanate cylinders 29. Conducting means 15 and 16 are provided for transmitting an alternating current to the acoustic energy source consisting of the plurality of barium-titanate crystals 29 which are connected in parallel. Conductors 24 and 25 are connected to the detecting means 30 at terminals 64 and 65 for conducting electrical signals which are responsive to impinging reflected acoustical waves to the recording equipment at the surface. The recording equipment at the surface consists of a pre-amplifier 26, the voltage of which is proportional to the input voltage which is the voltage received from the detecting means 30. The output voltage is passed through an automatic gain control amplifier 41 and a driver amplifier 18 and from thence through conductors 15 and 16 to the plurality of barium-titanate cylinders 29 which are connected in parallel. With the proper phase adjustment this system is self-driven and regulates its own frequency. Also provided within the embodiment shown in Fig. 2 is an inside column 43 which is made up almost entirely of a mixture of powdered lead and rubber. This substance is a high absorber of underwater sound and as such is highly nonresonant. Therefore, there is no energy stored in the column.

In Fig. 3 there is shown one embodiment of our new acoustic logging apparatus with a different electrical system being utilized at the earth's surface. As shown in Fig. 3, the driving current from driver amplifier 18 is passed through the winding of a transformer 50. A lower current is taken from the amplifier through phase adjusting network 51 where it is made 180° out of phase with the driving current and it is limited to make the flux generated in the core slightly less than that produced by the driving current and in phase opposition thereto. This will cause a situation where a small change in driving current will produce a large flux change percentage-wise. A third winding of many turns is connected to a recording vacuum tube voltmeter 27 and recorded on a recording galvanometer 52. The surface equipment provides us with a constant acoustic pressure at the surface of the cylinders. It has been found that the amplitude of vibration of the barium-titanate cylinders is a function of the acoustic impedance of the formations traversed by the housing 11. By definition the $$\text{acoustic impedance} = \frac{\text{acoustic pressure}}{\text{particle velocity}}$$

Since the acoustic impedance of the barium-titanate cylinders remains constant and the acoustic impedance of the fluids within the housing 11 and the mud fluid within the borehole is also constant, any variation in the amplitude of vibration of the barium-titanate cylinders is believed to be due to a change in acoustic impedance of formations traversed. The pickup 23, as shown in Fig. 1, or 30, as shown in Figs. 2 and 3, provides an indication of the amount of amplitude vibration. The foregoing theory, however, is given only by way of an attempt to describe why our new system operates efficiently and we do not intend to be thereby limited to any particular physical theory to explain the operation of our new instrument. We do know that regardless of the theory behind the operation of the instrument the electrical signal generated by the detecting means is indicative of the type of subsurface formations traversed by our new instrument. The signals recorded are substantially free of undesired standing waves, there being, on the average, only 1/10 the standing waves present in any other previously used system.

In operation, our instrument is lowered within the borehole and whenever it is desired to take an acoustical impedance log the barium-titanate cylinders 12 are caused to cyclically expand and contract thereby emitting acoustical waves into the subsurface formations. The amplitude of vibration of the cylinders 12 varies in accordance with the type of formation traversed. These vibrations are detected by means of the barium-titanate detectors 23 or 30 and transmitted to the earth's surface and recorded. The electrical signals thus recorded give an indication of the type of formations traversed. Because of the non-resonant acoustic features of our new invention and because of the fact that the acoustical energy is radially transmitted, the record data does not include frequency responsive signals nor does the data include the standing waves which were formerly obtained by other type acoustic impedance apparatus.

While we have described several specific embodiments of the present invention, it will be evident to a worker skilled in the art that various changes may be made in the apparatus without departing from the scope of the invention.

We claim:

1. An improved apparatus for acoustic impedance logging of subsurface formations adjacent a borehole comprising: a housing adapted to be lowered into the borehole; a plurality of barium-titanate cylinders mounted within said housing and coaxial therewith; electrodes disposed within said housing, one electrode being disposed about the inside periphery of each cylinder and a second electrode being disposed about the outside periphery of each cylinder; means for causing simultaneous continuous expansion and contraction of said barium-titanate cylinders, thereby sending continuous acoustic waves through said subsurface formations; detecting means mounted coaxially within said housing in a manner to separate each barium-titanate cylinder from adjacent barium-titanate cylinders; and means for obtaining an electrical signal from said detecting means indicative of the type of formations traversed by said housing.

2. An improved apparatus in accordance with claim 1 wherein said detecting means includes a barium-titanate cylinder within said housing and coaxial therewith; an electrode disposed about the inside periphery of said cylinder; and an electrode disposed about the outside periphery of said cylinder.

3. An improved apparatus in accordance with claim 2 wherein there are at least two barium-titanate cylinders spaced from one another, with said cylinders being electrically connected in parallel and wherein said detecting means in disposed between said two spaced-apart barium-titanate cylinders.

4. An improved apparatus for acoustic impedance logging of subsurface formations adjacent a borehole comprising: a housing adapted to be lowered into the borehole; a piezoelectric detector mounted within said housing; piezoelectric sound transmitting means mounted within said housing adjacent said detector and including at least one piezoelectric transmitter, the arrangement being such that the longitudinal extremities of the sound transmitting means extend above and below the longitudinal extremities of the piezoelectric detector; means for causing the continuous expansion and contraction of said piezoelectric sound transmitting means; and means for obtaining an electrical signal from said piezoelectric detector indicative of the type of formations traversed by said housing.

5. An improved apparatus for acoustic impedance logging of subsurface formations adjacent a borehole in accordance with claim 4 wherein the piezoelectric sound transmitting means is a barium-titanate cylinder, and the piezoelectric detector is disposed within said barium-titanate cylinder.

References Cited in the file of this patent

UNITED STATES PATENTS

| 2,233,992 | Wyckoff | Mar. 4, 1941 |
| 2,586,745 | Tullos | Feb. 19, 1952 |
| 2,596,023 | Goble et al. | May 6, 1952 |
| 2,694,461 | Martin | Nov. 16, 1954 |
| 2,708,485 | Vogel | May 17, 1955 |
| 2,722,282 | McDonald | Nov. 1, 1955 |